(12) United States Patent
Tsukamoto et al.

(10) Patent No.: US 10,074,975 B2
(45) Date of Patent: Sep. 11, 2018

(54) POWER SUPPLY CONTROLLER

(71) Applicant: NISSAN MOTOR CO., LTD., Yokohama-shi, Kanagawa (JP)

(72) Inventors: Yukari Tsukamoto, Sagamihara (JP); Takeshi Fujita, Kanagawa (JP); Chiduru Matsuyama, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 724 days.

(21) Appl. No.: 14/355,415

(22) PCT Filed: Oct. 9, 2012

(86) PCT No.: PCT/JP2012/076112
§ 371 (c)(1),
(2) Date: Apr. 30, 2014

(87) PCT Pub. No.: WO2013/065454
PCT Pub. Date: May 10, 2013

(65) Prior Publication Data
US 2014/0265600 A1    Sep. 18, 2014

(30) Foreign Application Priority Data

Nov. 1, 2011   (JP) ................................ 2011-239960
Aug. 13, 2012  (JP) ................................ 2012-179319

(51) Int. Cl.
*H02J 1/00*   (2006.01)
*H02J 1/10*   (2006.01)
*H02J 7/00*   (2006.01)

(52) U.S. Cl.
CPC .................................... *H02J 1/00* (2013.01); *H02J 1/10* (2013.01); *H02J 7/0024* (2013.01); *Y02T 10/7055* (2013.01); *Y10T 307/685* (2015.04)

(58) Field of Classification Search
CPC ... H02J 1/00; H02J 7/0024; H02J 1/10; Y02T 10/7055; Y10T 307/685
See application file for complete search history.

(56) References Cited

U.S. PATENT DOCUMENTS 5,633,540 A    5/1997 Moan
6,741,065 B1 *  5/2004 Ishii .................... B60L 11/1816
                                                 320/122

(Continued)

FOREIGN PATENT DOCUMENTS

CN      101752882 A    6/2010
EP      1 837 944 A2   9/2007
(Continued)

OTHER PUBLICATIONS

Williams, R.K. et al., "Single Package 30-V Battery Disconnect Switch Facilitates Battery Multiplexing in Notebook Computers", *IEEE*, Applied Power Electronics Conference and Exposition, vol. 2, Feb. 15, 1998, pp. 691-699.

*Primary Examiner* — Jared Fureman
*Assistant Examiner* — Emmanuel R Dominique
(74) *Attorney, Agent, or Firm* — Foley & Lardner LLP (57) ABSTRACT

A power supply device (1) includes a parallel connection of a plurality of series circuits each including a secondary battery (11A, 11B) and a relay (12A, 12B) connected in series with the secondary battery. A control apparatus for controlling ON/OFF timings of the relays (12A, 12B) includes a control device (2) to set a time difference between the ON/OFF timings of the relays (12A, 12B) to control the supply of power at optimum timings.

10 Claims, 10 Drawing Sheets

(56) References Cited

U.S. PATENT DOCUMENTS

| | | | |
|---|---|---|---|
| 9,030,167 B2* | 5/2015 | Yamaguchi | H01M 10/425 320/117 |
| 2002/0140397 A1 | 10/2002 | Hasegawa et al. | |
| 2002/0171397 A1* | 11/2002 | Adrian | H01M 6/5033 320/119 |
| 2007/0247106 A1* | 10/2007 | Kawahara | B60L 3/0046 320/104 |
| 2008/0247105 A1* | 10/2008 | Divan | H02H 3/207 361/56 |
| 2012/0313439 A1* | 12/2012 | Yamaguchi | H01M 10/425 307/71 |
| 2013/0038289 A1* | 2/2013 | Tse | H02M 3/158 320/118 |
| 2013/0113290 A1* | 5/2013 | Sato | B60L 3/0046 307/80 |
| 2013/0329327 A1* | 12/2013 | Zara | H02H 9/025 361/86 |
| 2014/0103859 A1* | 4/2014 | Nishi | B60L 11/1866 320/103 |

FOREIGN PATENT DOCUMENTS

| | | | | |
|---|---|---|---|---|
| EP | 1837944 A2 | * | 9/2007 | |
| EP | 1837944 A2 | * | 9/2007 | H01M 10/441 |
| JP | 11-115649 A | | 4/1999 | |
| JP | 2000-513559 A | | 10/2000 | |
| JP | 2002-305843 A | | 10/2002 | |
| JP | 2003-227865 A | | 8/2003 | |
| JP | 2007-259612 A | | 10/2007 | |
| JP | 2009-033936 A | | 2/2009 | |
| JP | 2010-252566 A | | 11/2010 | |
| JP | WO 2011096431 A1 | * | 8/2011 | |

* cited by examiner

POWER SUPPLY CONTROLLER

TECHNICAL FIELD

The present invention relates to control apparatus for a power supply.

BACKGROUND ART

There is known a system to turn on one of relays connected in parallel, in a switching circuit for switching power between a power supply and a load, and thereafter to turn on the other relay after a delay time for stabilizing a surge current (Patent Document 1).

Recently, investigation is under way for the use of a parallel combination of a plurality of secondary batteries as power supply for supplying power to electric load (hereinafter referred simply as load) for facilities and homes and for electric vehicles. In the power supply of this type, a relay is connected in series with each of the secondary batteries and the secondary batteries are connected in parallel through the relays because there is a need for connecting the secondary batteries in such a disconnectable manner to electrically disconnect the secondary batteries individually for maintenance or for sensing the state of each secondary battery (such as an open circuit voltage).

However, in the power supply including the secondary batteries connected in parallel through the relays, when a plurality of the relays connected with the secondary batteries are turned on simultaneously, a current is generated at the output of the power supply by overlapping or superposition of surge currents generated in the relays, and the output current of the power supply might be increased excessively. To solve this problem, one conceivable system may employ two relays connected in parallel at the output of each secondary battery and turn on the relays by turning on one of the relays first and then turning on the other after a delay time to stabilize the surge current, as in the above-mentioned earlier technology. However, two relays are needed for each secondary battery and the cost is increased.

PRIOR ART LITERATURE

Patent Document(s)

Patent Document 1: JP2000-513559 A

SUMMARY OF THE INVENTION

It is an object of the present invention to provide a power supply control apparatus for preventing overcurrent due to surge currents while restraining an increase of the cost.

According to the present invention, for a power supply including a parallel connection of series circuits each including a secondary battery and a relay connected in series with the secondary battery, a time difference is set among ON/OFF timings of the relays at the time of turning on/off the relays.

By setting the time difference among the ON/OFF timings of the relays, the apparatus or system can restrain cost increase without the need for providing another relay or the like for preventing overcurrent due to surge currents, and switch the supply of power quickly with effect of restraining overcurrent due to surge currents.

MODE(S) FOR CARRYING OUT THE INVENTION

Figure 1:
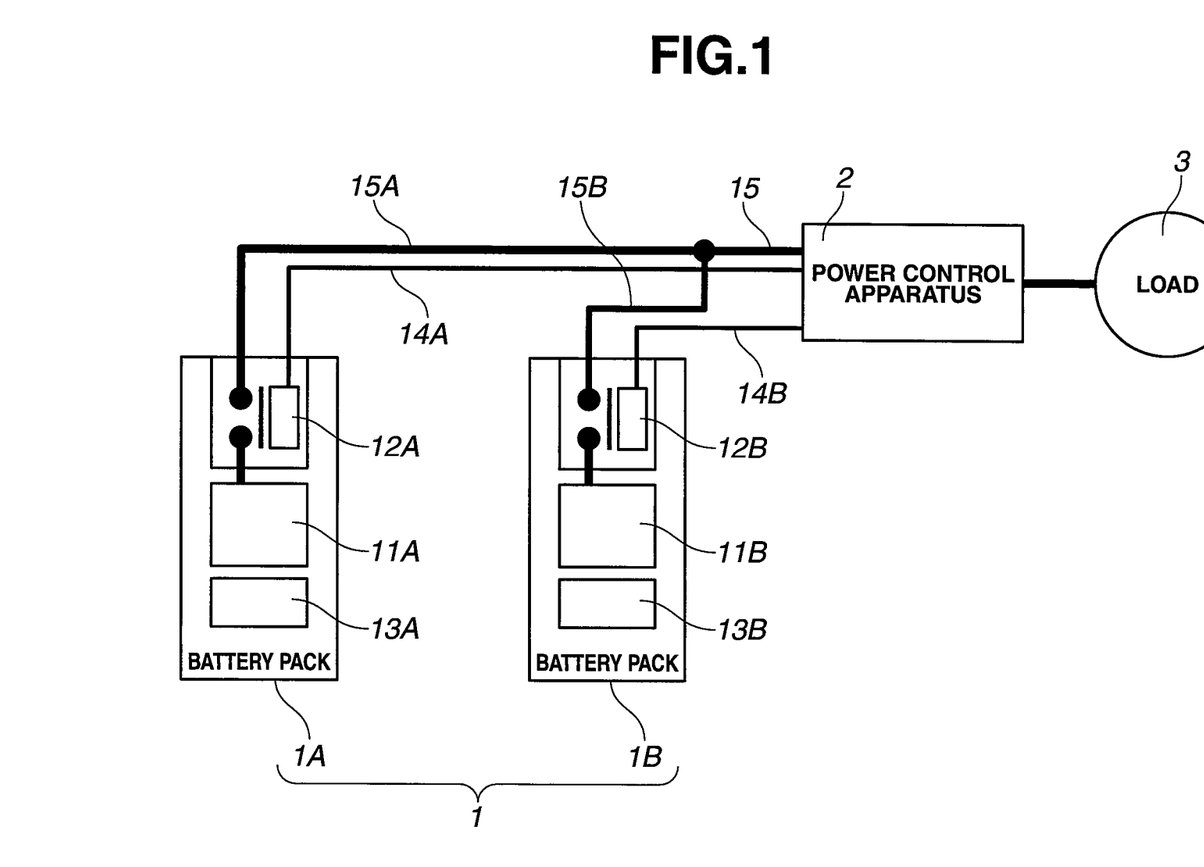
FIG. 1 is a block diagram showing an electric power supplying system to which a first embodiment of the present invention is applied.

Following is explanation on embodiment(s) of the present invention with reference to the drawings. A power supply control apparatus according to a first embodiment of the present invention is adequate or desirable when applied to a power supply or power source (also referred to as a power supply device) including a parallel combination of a plurality of series circuits each including a secondary battery and a relay connected in series with the secondary battery. FIG. 1 shows one example in which the power supply control apparatus is applied to such a power supply device.

In FIG. 1, a power supply device 1 includes two battery packs 1A and 1B which are connected in parallel through relays 12A and 12B and power lines 15A and 15B, respectively, and arranged to output power from a power line 15 as an output line. Though, in this example, two battery packs 1A and 1B are connected in parallel, the power supply device 1 may include a parallel combination of three or more battery packs. A load 3 is an electric load receiving an output power from power line 15 of power supply device 1, through a later-mentioned power supply control apparatus 2. For example, the load 3 includes a driving motor of an electric vehicle. The power supply control apparatus 2 is a power controller according to this embodiment. This power supply control apparatus 2 performs operation of converting the electric power supplied from power supply device 1 to a predetermined voltage, for example, and supplying the electric power to load 3, and an ON/OFF control of controlling the relays 12A and 12B of battery packs 1A and 1B through control signal lines 14A and 14B, respectively.

Each battery pack 1A or 1B includes a secondary or rechargeable battery 11A or 11B arranged to discharge to the load 3 or to charge with regenerated power from the load 3 or power from another power supply not shown. In this case, if the secondary batteries 11A and 11B of battery packs 1A and 1B are not uniform in the battery capacity, there is a possibility of deterioration of the secondary batteries 11A and 11B due to overcharging or overdischarging. Therefore, battery packs 1A and 1B are separated from each other periodically by turning off the relays 12A and 12B; the remaining capacities of secondary batteries 11A and 11B are sensed by measurement of open circuit voltage (OCV); and a capacity adjusting operation is performed to equalize the remaining capacities of secondary batteries 11A and 11B. After the measurement of the open circuit voltage (OCV), the relays are turned on again. In this case, however, a surge current is generated in each of power lines 15A and 15B, and hence there arises a need for preventing overcurrent from being produced in power line 15 by overlap (composition) of the surge currents generated in power lines 15A and 15B. Hereinafter, the overcurrent resulting from surge currents is also referred to as surge current. A process for restraining the surge current is explained later.

Each of battery packs 1A and 1B in power supply device 1 includes a battery controller 13A or 13B in addition to the secondary battery 11A or 11B and the relay 12A or 12B. As mentioned above, in each battery pack 1A or 1B, the relay 12A or 12B is turned off at the time of measurement of the open circuit voltage OCV of secondary battery 11A or 11B, and turned on at the time of supply of electric power to the load or at the time of capacity adjustment of secondary battery 11A or 11B. In this example, each battery pack 1A or 1B is a pack of secondary battery 11A or 11B, relay 12A or 12B and battery controller 13A or 13B which are packaged in a single unit. However, the application of the power supply control device 2 according to the present invention is not limited to the battery backs 1A and 1B having such a construction. The power supply control device 2 is applicable to the power supply device in which the secondary battery, the relay and the battery controller are provided separately.

Figure 2:
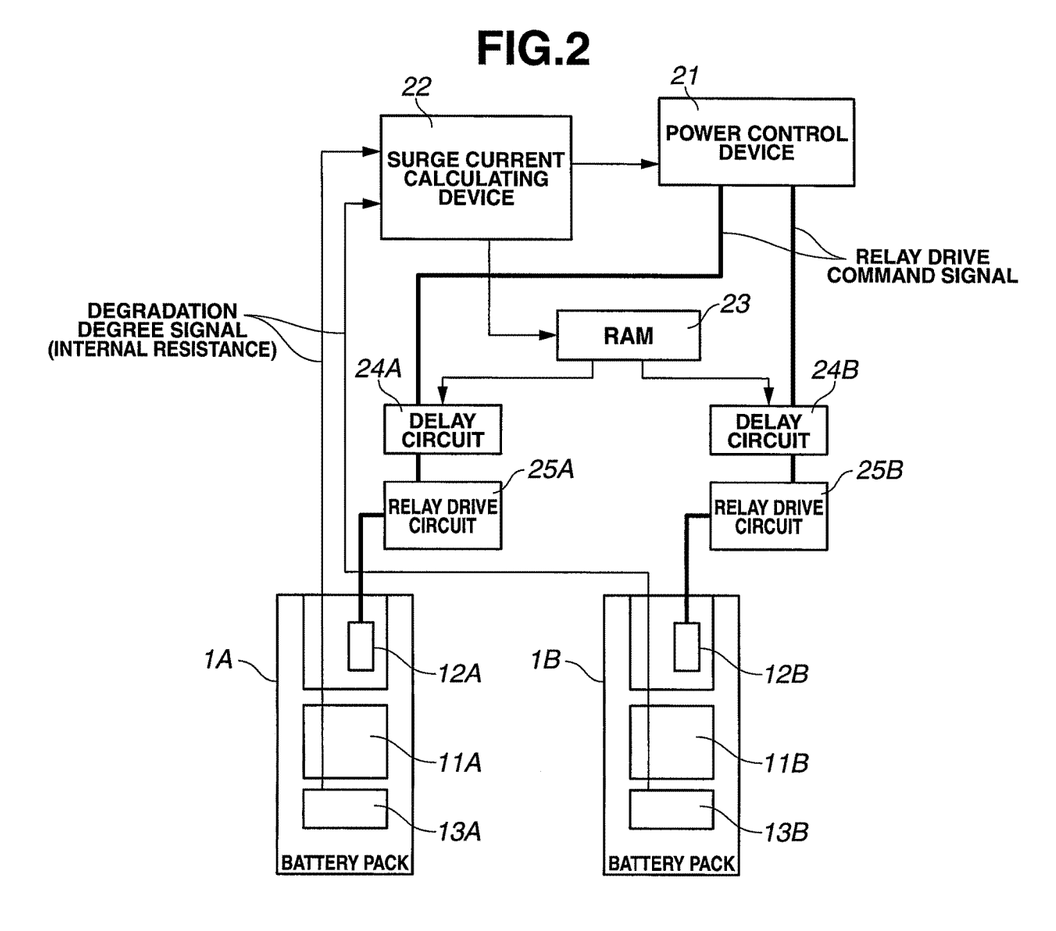
FIG. 2 is a block diagram showing a power supply control apparatus according to the first embodiment of the present invention.

Power supply control apparatus 2 of this example is constructed as follows. FIG. 2 is a block diagram showing the inner construction of the power supply control device 2. In FIG. 2, the power lines 15A and 15B are omitted. As shown in FIG. 2, the power supply control apparatus 2 of this example includes a power control device 21, a surge current calculating device 22, a memory 23, delay control circuits 24A and 24B and relay drive circuits 25A and 25B.

Surge current calculating device 22 receives, as input, a degradation degree (in this example, the internal resistance R is used as the degradation degree) of each secondary battery 11A or 11B calculated by the battery controller 13A or 13B in the battery pack 1A or 1B, and calculates the amplitude and frequency of the surge current of each battery packs 1A and 1B, from previously inputted inductance L and electric capacitance C of the system of this example. The amplitude i(t) and frequency ω of the surge current can be calculated in the following manner, and hence the surge current calculating device 22 performs the following calculation.

A voltage equation of an LCR circuit is expressed by a following mathematical expression (1). In this expression, C is the electric capacitance of the system, L is the inductance of the system, R is the internal resistance of the secondary battery 11A or 11B, and V0 is the open circuit voltage of the secondary battery 11A or 11B.

$$\frac{1}{C}\int_0^t i\,dt + L\frac{di}{dt} + iR = V_0 \qquad \text{[Expression 1]}$$

By solving this equation, the amplitude i(t) and frequency ω of the surge current are expressed by following expressions (2) and (3).

$$i(t) = \frac{V_0}{\omega L} e^{-Rt/2L} \sin\omega t \qquad \text{[Expression 2]}$$

-continued $$\omega = \left[\frac{1}{LC} - \left(\frac{R}{2L}\right)^2\right]^{1/2} \qquad \text{[Expression 3]}$$

Power control device 21 outputs relay drive command signals to perform the ON/OFF control of relays 12A and 12B. The relay drive command signals produced by power control device 21 are delivered to the relay drive circuit 25A and 25B, respectively, at timings determined in accordance with set values of the delay circuits 24A and 24B, and the relays 12A and 12B are controlled between ON and OFF in response to these signals.

Figure 4:
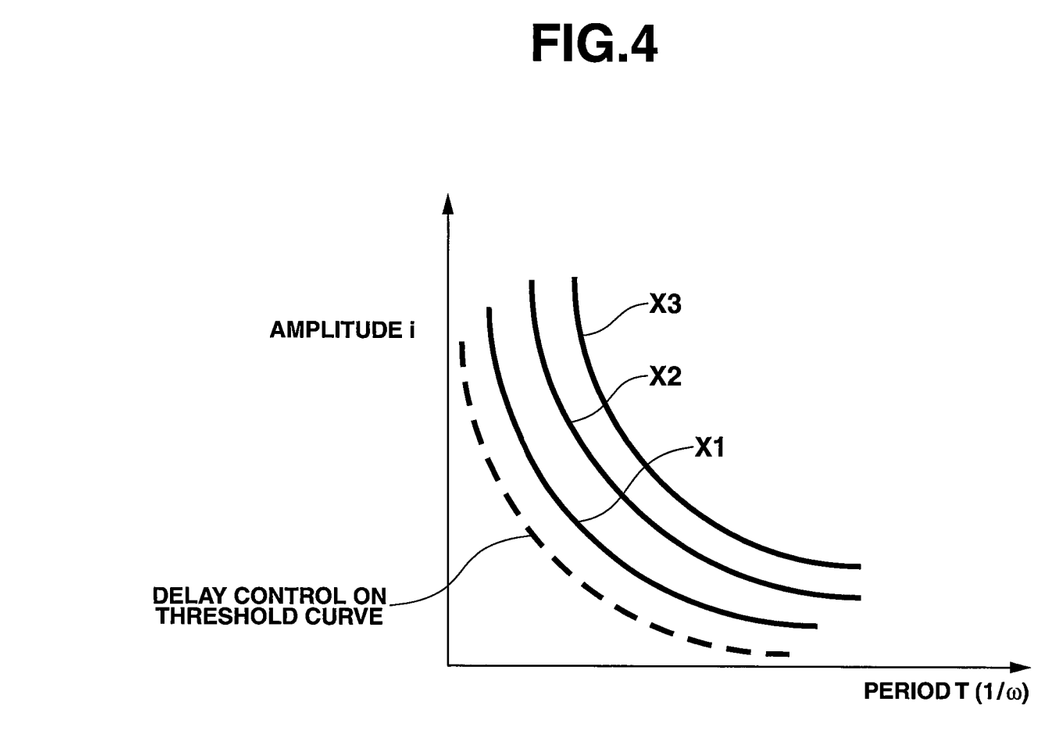
FIG. 4 is a view showing one example of a control map used at a step S306 in FIG. 2.

Memory 23 stores a control map of a delay time based on the amplitude and frequency of the surge current, as shown in FIG. 4, and delivers, to each delay circuit 24A or 24B, a command signal regarding the delay time corresponding to the amplitude i(t) and frequency ω of the surge current inputted from surge current calculating device 22.

Operations of the power control apparatus 2 of this example are explained hereinafter with reference to flowcharts of FIGS. 3, 5 and 6.

First Embodiment

For performing the control of this example, an initial value of the internal resistance of each secondary battery 11A or 11B (the internal resistance value at the time when the secondary battery 11A or 11B is new) is inputted to surge current calculating device 22, and an initial value of the delay time is inputted to each delay circuit 24A or 24B. The delay time is a delay time or lag of the ON/OFF timing of one of relays 12A and 12B with respect to the ON/OFF timing of the other relay. The initial value of the delay time is a delay time value capable of preventing overcurrent from being generated by the surge current(s) when secondary batteries 11A and 11B are new or when the internal resistances of the secondary batteries 11A and 11B are equal to the internal resistance values of the new batteries.

Figure 3:
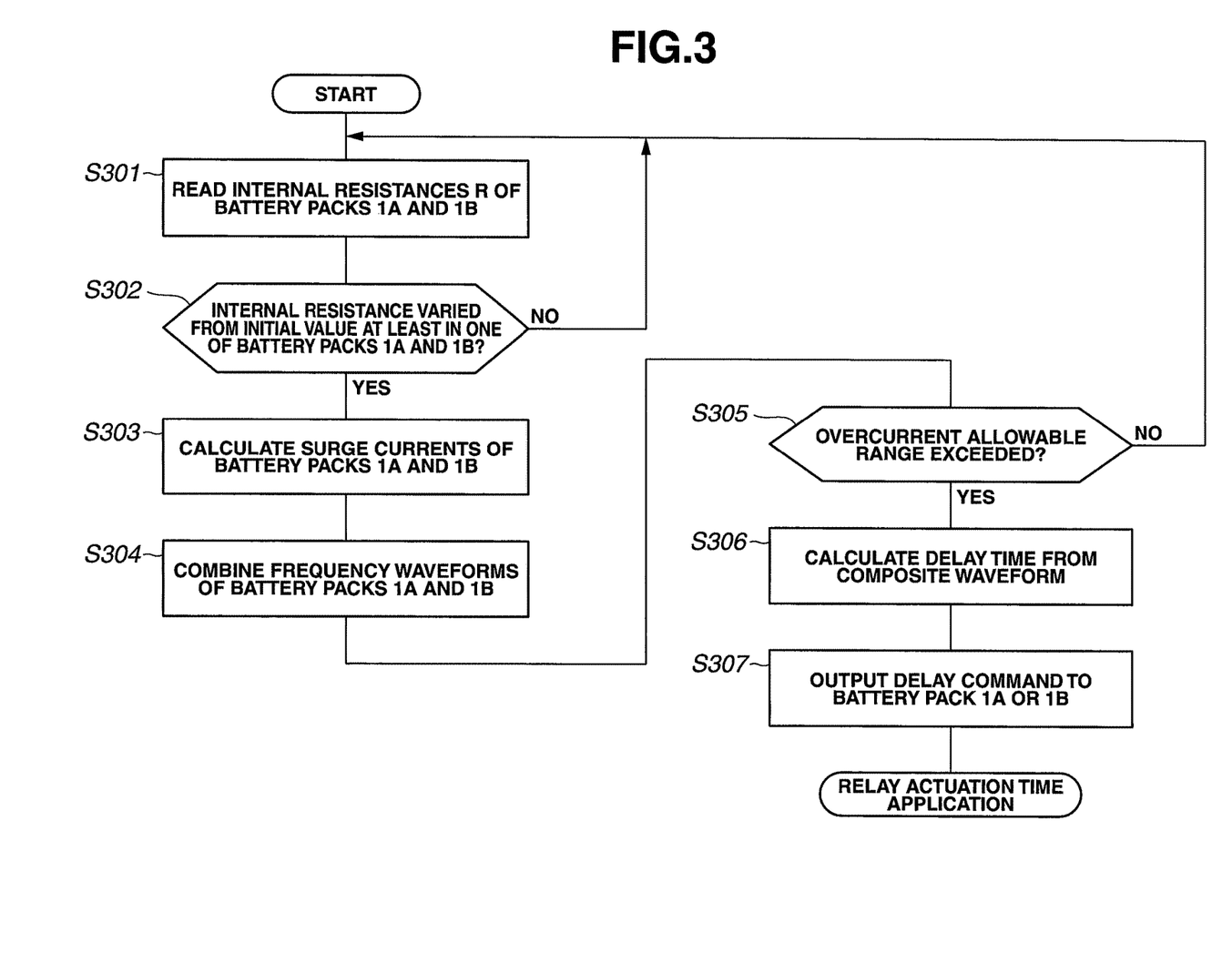
FIG. 3 is a flowchart showing operations of the power supply control apparatus shown in FIG. 2.

As shown in FIG. 3, at a step S301, the surge current calculating device 22 reads the internal resistance values of secondary batteries 11A and 11B held, respectively, by battery controllers 13A and 13B of battery packs 1A and 1B. At a step S302, surge current calculating device 22 determines whether at least one of the read internal resistances of secondary batteries 11A and 11B has varied from the initial value. Surge current calculating device 22 proceeds to a step S303 when there is a variation from the initial value, of at least one of the read internal resistances, and returns to the step S301 when there is no variation. When the internal resistances of secondary batteries 11A and 11B remain unvaried, the delay times of delay circuits 24A and 24B are held equal to the respective initial values, and the relays 12A and 12B are controlled between ON and OFF on the basis of the initial values of the delay times.

At step S303, surge current calculating device 22 calculates the amplitude i(t) and frequency ω of the surge current of each of battery packs 1A and 1B (the surge current generated in each power line 15A or 15B), by using the above-mentioned expressions (2) and (3). At a step S304, the apparatus determines a waveform of the surge current from the amplitude and frequency of the surge current of each of battery packs 1A and 1B calculated at step S303, and predicts a surge current waveform (composite or synthesized waveform) generated in power line 15 by combining or synthesizing the waveforms of the surge currents of battery packs 1A and 1B.

At a step S305, the apparatus judges whether the amplitude (magnitude) of the resulting composite surge current waveform synthesized at step S304 exceeds a predetermined allowable overcurrent range. From S305, the apparatus proceeds to a step S306 when the allowable range is exceeded. When the allowable range is not exceeded, the apparatus returns to step S301 and sets the delay times of delay circuits 24A and 24B equal to the respective initial values without modification.

At step S306, the apparatus calculates the delay time X1, X2, X3 . . . by applying the amplitude and frequency of the composite waveform determined at step S304, to the control map which is determined preliminarily by experiments or the like, which is stored preliminarily in memory 23, and which represents the relationship between the composite waveform and the delay time as shown in FIG. 4. At a step S307, the apparatus outputs the delay time Xn calculated at step S306, to either of delay circuits 24A and 24B, and terminates the process of this example. The relays 12A and 12B of battery packs 1A and 1B are controlled between ON and OFF in accordance with the delay times set at delay circuits 24A and 24B.

Figure 7:
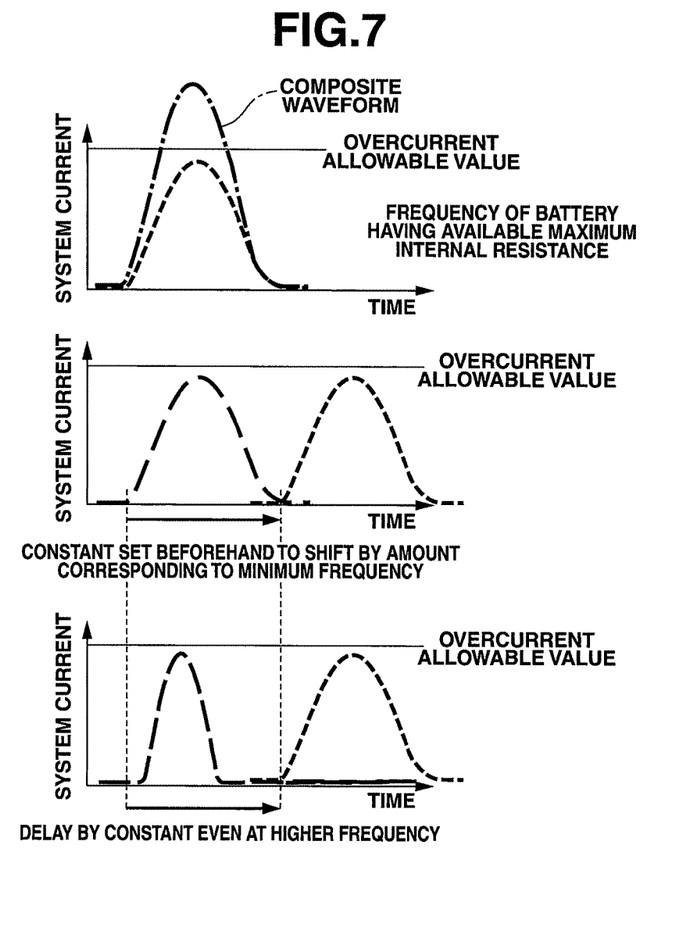
FIG. 7 is a graphic view showing effects of a practical example according to the present invention.

When the surge current waveforms of the two battery packs 1A and 1B are approximately equal to each other as shown in an upper graph in FIG. 7, a surge current restraining effect is exhibited with a fixed delay time as shown in a middle graph in FIG. 7. However, when the surge current waveforms of the two battery packs 1A and 1B are different in frequency from each other as shown in an lower graph in FIG. 7, the control using the delay time of a fixed value causes a useless time interval between the two surge current waveforms, and hence does not provide adequate ON/OFF control performance of the relays at optimum timings.

Figure 8:
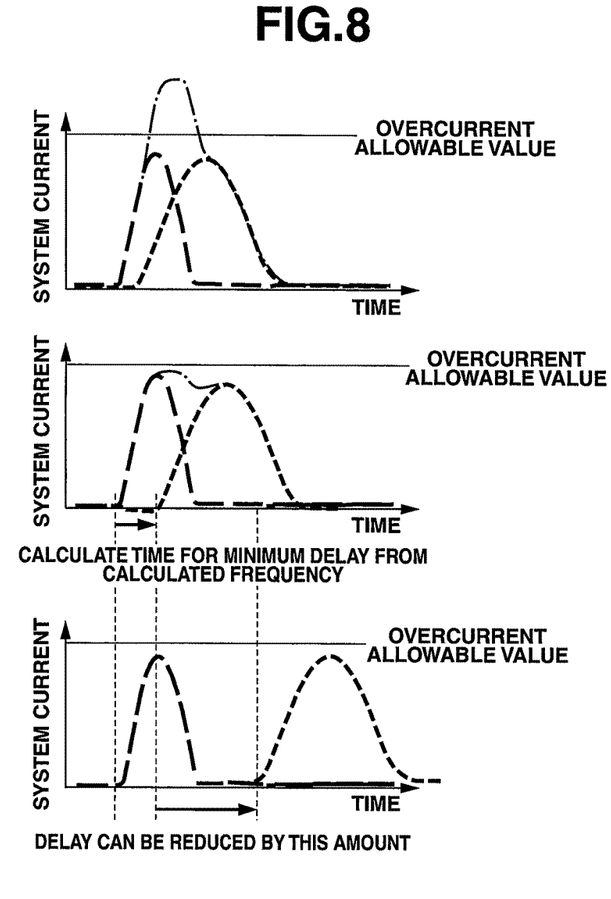
FIG. 8 is a graphic view showing effect of the practical example according to the present invention.

However, the apparatus can set the optimum delay time by setting the delay time at a value corresponding to the amplitude i(t) and frequency of the surge current varying in dependence on the degradation degrees (internal resistances R) of secondary batteries 11A and 11B, as mentioned before. Even when the surge current waveforms of battery packs 1A and 1B are difference in frequency as shown in an upper graph in FIG. 8, the apparatus calculates the optimum delay time by setting the delay time corresponding to the composite waveform obtained by combining the surge currents of the battery packs. Therefore, the two surge current waveforms are connected at an optimum timing as shown in a middle graph in FIG. 8, and the apparatus can reduce the useless time interval as shown in a lower graph in FIG. 8, as compared to a conventional system.

According to this example, the apparatus or system can perform changeover of the supply of power in a short time while restraining the surge current for the power supply device 1 including the parallel combination of battery packs 1A and 1B each of which includes a series circuit of secondary battery 11A or 11B and relay 12A or 12B. In this case, the apparatus calculates the surge current waveforms (frequencies and amplitudes) at the time of turn-on of relays 12A and 12B in accordance with the internal resistances (degradation degrees) of the secondary batteries 11A and 11B, further calculates the resulting composite waveform, and sets the ON/OFF timing of each relay 12A or 12B by using the composite waveform-delay time MAP stored preliminarily. By so doing, the system can reduce the time of calculating the ON/OFF timings.

Second Embodiment

Figure 5:
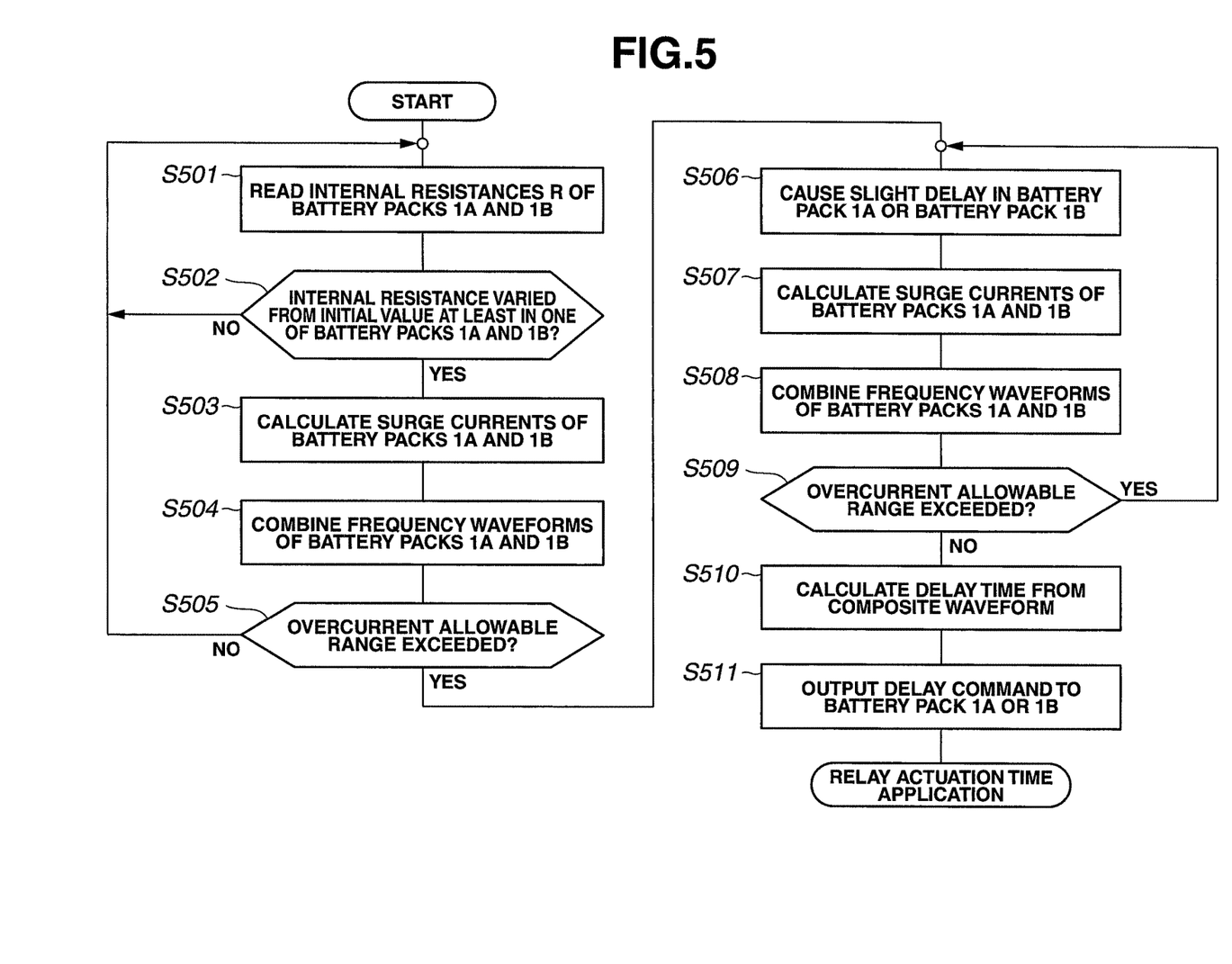
FIG. 5 is a flowchart showing operations of a power supply control apparatus according to a second embodiment of the present invention.

FIG. 5 is a flowchart showing operations of a power supply control apparatus according to a second embodiment of the present invention. The second embodiment is different from the first embodiment in the process of calculating the delay time. As to the construction of the power supply control apparatus 2, the memory 23 shown in FIG. 2 is omitted, and the output of surge current calculating device 22 is connected directly to delay circuits 24A and 24B. Steps S501~S505 are the same as steps S301~S305 shown in FIG. 3, so that repetitive explanation is omitted.

At step S506, the surge current calculating device 22 performs a setting operation to assume that either of delay circuits 24A and 24B is delayed by a predetermined slight time or short time interval, that is, the ON/OFF timing of either of relays 12A and 12B is delayed by the slight time with respect to the ON/OFF timing of the other relay. Then, at a step S507, the surge current calculating device 22 calculates the waveform of the surge current of each of battery packs 1A and 1B (the surge current generated in each of power lines 15A and 15B) by using the above-mentioned equations (2) and (3). Then, at a step S508, the apparatus combines or synthesizes the two surge current waveforms calculated at S507 by delaying one of the surge current waveforms by the predetermined slight time with respect to the other surge current waveform. At a step S509, the apparatus judges whether the amplitude (magnitude) of the synthesized surge current waveform (the composite waveform) exceeds the or a predetermined overcurrent allowable range. From S509, the apparatus proceeds to a step S510 when the overcurrent allowable range is not exceeded, and returns to the step S506 when the overcurrent allowable range is exceeded.

In the case of return to step S506, the apparatus assumes that either of the delay circuits 24A and 24B is further delayed by the slight time, and repeats steps S507~S509 until the amplitude (magnitude) of the synthesized surge current waveform becomes equal to a level not exceeding the predetermined overcurrent allowable range.

When the amplitude (magnitude) of the synthesized surge current waveform becomes equal to values not exceeding the predetermined overcurrent allowable range, the apparatus proceeds to step S510 and sets, as the delay time, the then-existing value of the delay time, that is, an accumulated or integrated value of the values of the slight time used for the slight delay at S506. Then, at a step S511, the apparatus outputs the delay time to either of delay circuits 24A and 24B, and terminates the process of this example.

In this example, by setting the delay time gradually until the allowable range is not exceeded by the composite waveform of the surge current waveforms, the apparatus can improve the accuracy of calculating the ON/OFF timings of relays 12A and 12B.

Third Embodiment

Figure 6:
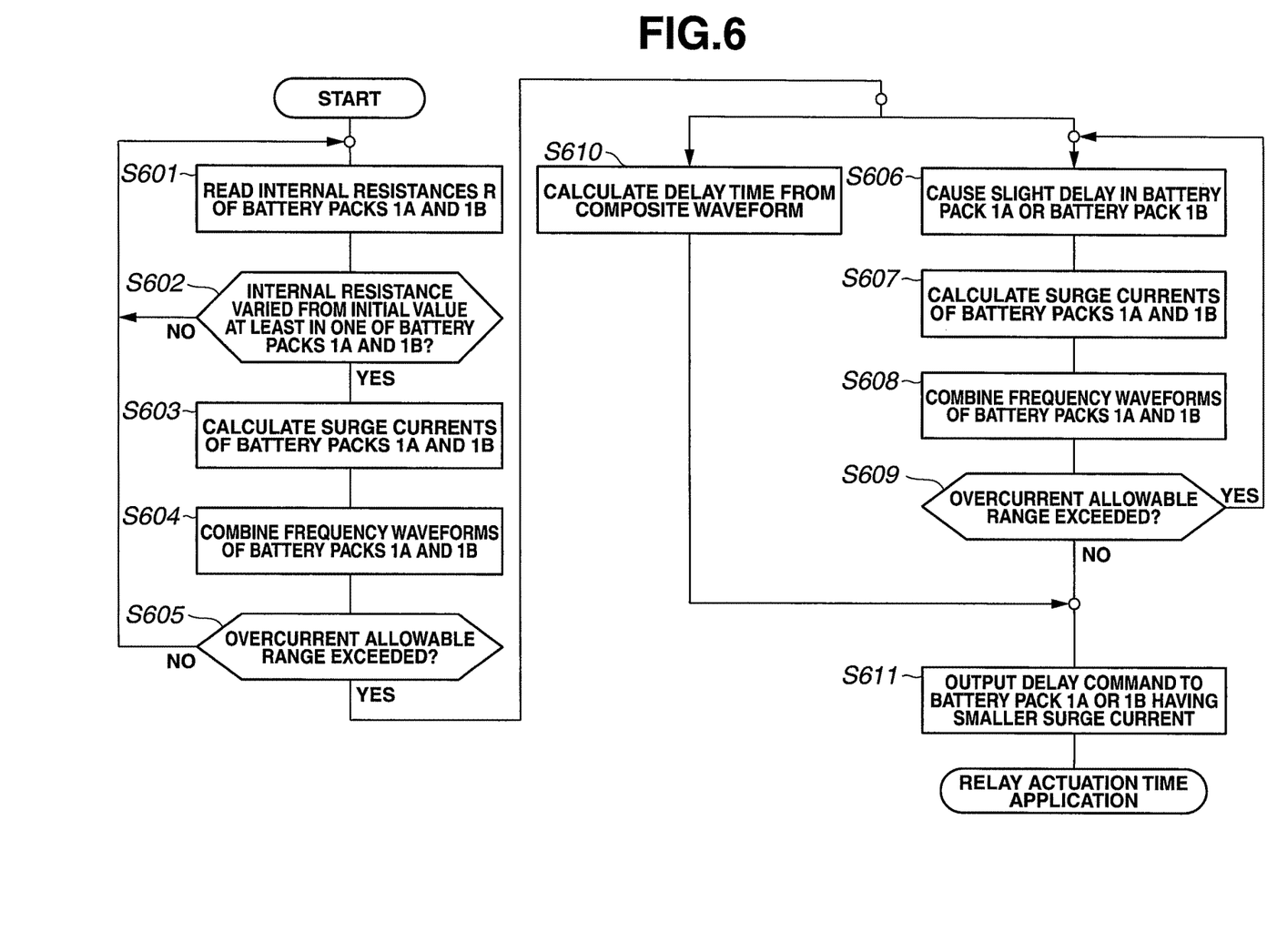
FIG. 6 is a flowchart showing operations of a power supply control apparatus according to a third embodiment of the present invention.

FIG. 6 is a flowchart showing operations of a power control apparatus according to a third embodiment of the present invention. The third embodiment is different from the first and second embodiments in operation of a step S611. The construction of the power supply control apparatus 2 according to the third embodiment is the same as that of the second embodiment. Steps S601~S605 are the same as steps S301~S305 shown in FIG. 3, S606~S609 are the same as steps S506~S509 shown in FIG. 5, and step S610 is the same as step S306 of FIG. 3 so that repetitive explanation is omitted.

In the third embodiment, the system can take either the process of steps S605→S610→S611 (like the process of the first embodiment) or the process of steps S605→S606→607→S608→S609→S610 (like the process of the second embodiment). For example, the system may be configured to calculate the delay time by using both of the process routes simultaneously and employs the value of the delay time calculated earlier.

At step S611, the system specifies the battery pack 1A or 1B having a smaller one of the surge currents determined in the preceding process, and outputs the delay command signal to the delay circuit 24A or 24B corresponding to the specified battery pack 1A or 1B.

In this way, by delaying the side in which the surge current (amplitude) is smaller, the apparatus can first turn on the relay 12A or 12B of the battery pack 1A or 1B in which the amplitude of the surge current is greater, before the other relay, and thereby prevent the overcurrent securely. Even if an error is involved in the calculation of the delay time, influence exerted by the calculation error of the delay time on the amplitude of the composite waveform is small when the relay on the side having the smaller surge current is delayed. Therefore, the system arranged to delay the side having the smaller surge current can prevent the overcurrent securely.

Further Embodiment(S)

In the preceding examples, the power supply device 1 includes two of the battery packs 1A and 1B connected in parallel. However, the number of the battery packs is not limit to two. For example, following is brief explanation based on a flowchart of FIG. 9, about one example in which the operations of the power control apparatus 2 according to the second embodiment are applied to the power supply device 1 including three of the battery packs 1A, 1B and 1C.

Figure 9:
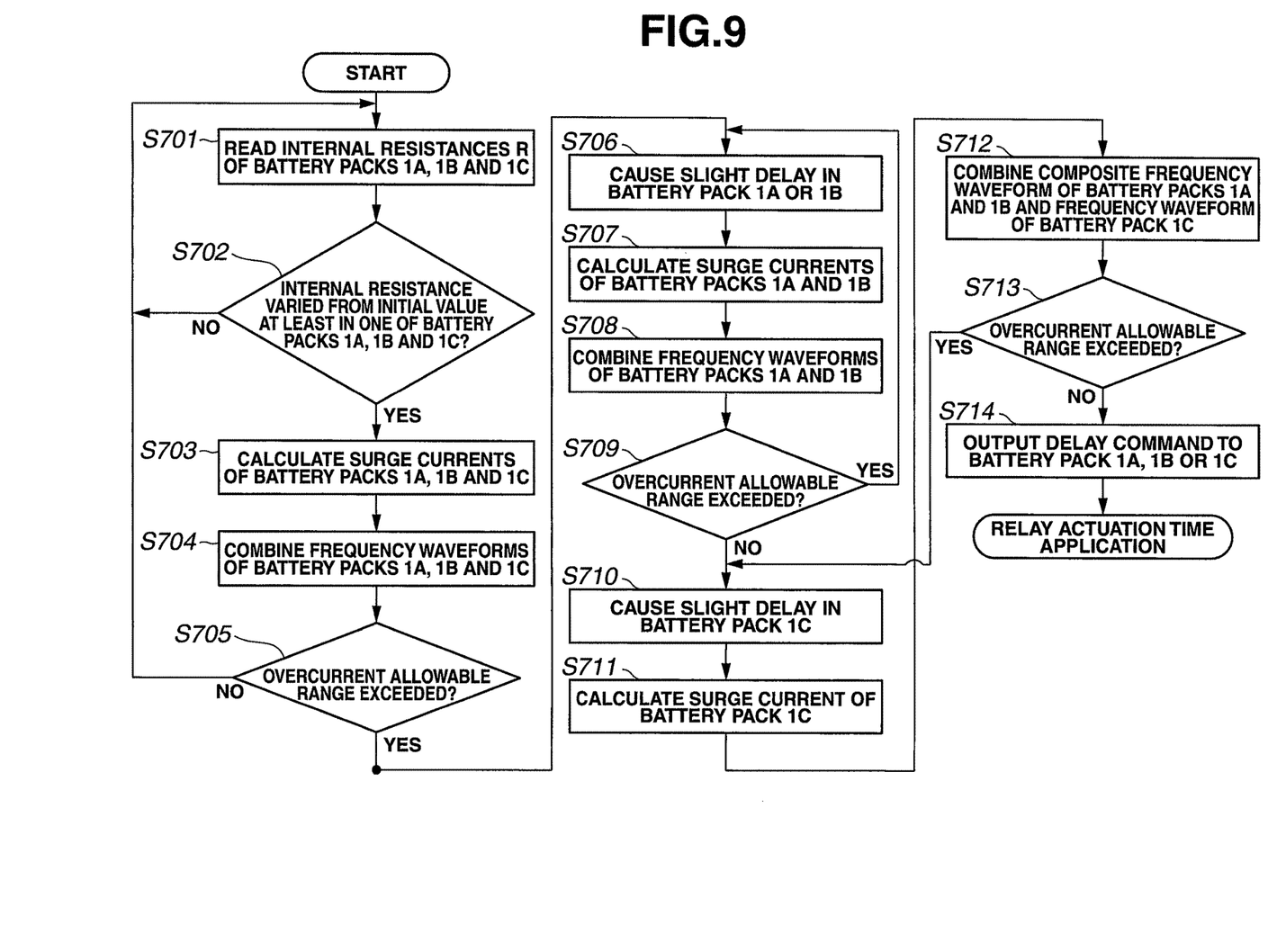
FIG. 9 is a flowchart showing operations of a power supply control apparatus according to a fourth embodiment of the present invention.

In the flowchart of FIG. 9, step S701~S709 are the same as step S501~S509 in the flowchart of FIG. 5, so that repetitive explanation is omitted.

At a step S710, the surge current calculating device 22 performs a setting operation to assume that the ON/OFF timing of relay 12C corresponding to battery pack 1C is delayed by a predetermined slight time with respect to the ON/OFF timing of either of relays 12A and 12B. Then, at a step S711, the surge current calculating device 22 calculates the waveform of the surge current of battery pack 1C (the surge current generated in power line 15C corresponding to battery pack 1C) by using the above-mentioned equations (2) and (3). In this example, the surge current waveform of battery pack 1C is calculated at step S711. However, it is optional to use the surge current waveform calculated at step S703, without modification.

Then, at a step S712, the apparatus combines or synthesizes the composite waveform of battery packs 1A and 1B calculated at step S708 and the waveform obtained by delaying the surge current waveform of battery pack 1C calculated at step S711, by the slight time set at step S710, with respect to the ON/OFF timing of either of the relays 12A and 12B. At a step S713, the apparatus judges whether the amplitude (magnitude) of the synthesized surge current waveform (the composite waveform) synthesized at step S712 exceeds the or a predetermined overcurrent allowable range. From S713, the apparatus proceeds to a step S714 when the overcurrent allowable range is not exceeded, and returns to the step S710 when the overcurrent allowable range is exceeded.

In the case of return to step S710, the apparatus assumes that the ON/OFF timing of relay 12C corresponding to battery pack 1C is further delayed by the slight time, and repeats steps S710~S713 until the amplitude (magnitude) of the synthesized surge current waveform becomes equal to a value not exceeding the predetermined overcurrent allowable range.

When the amplitude (magnitude) of the synthesized surge current waveform becomes equal to a value not exceeding the predetermined overcurrent allowable range at step S713, the apparatus outputs the delay time, with respect to one of relays 12A, 12B and 12C as reference, of the ON/OFF timing of the remaining relay(s). Thereafter, the apparatus terminates the process of this example.

Figure 10:
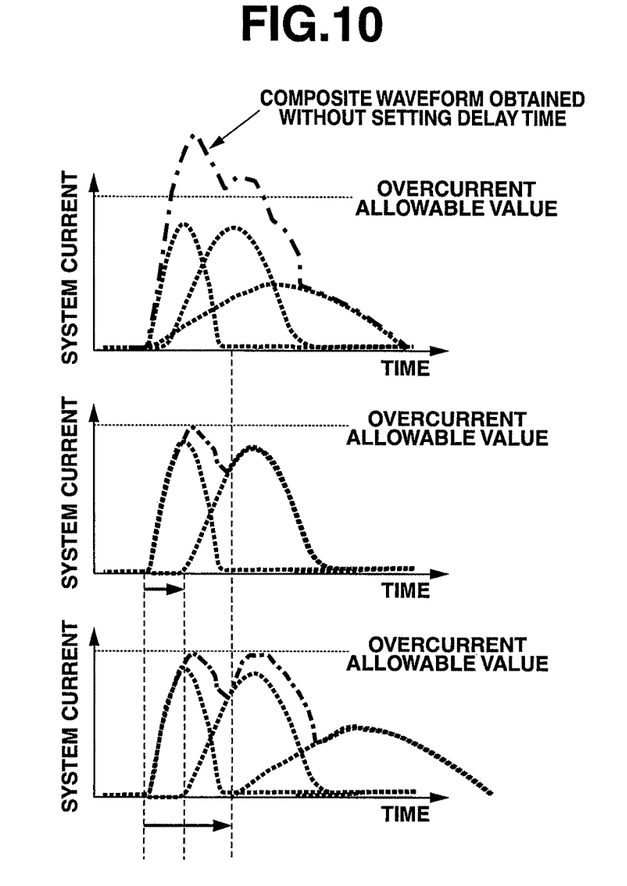
FIG. 10 is a graphic view showing effects of a practical example according to the present invention.

In FIG. 10, an upper graph shows surge current waveforms when no delay times are provided among the ON/OFF timings of relays 12A, 12B and 12C. The composite waveform exceeds the overcurrent allowable range. A middle graph in FIG. 10 shows surge current waveforms of battery packs 1A and 1B and the composite waveform of the surge current waveforms in the case of the affirmative judgment at step S709 in the flowchart of FIG. 9. At this stage, the surge current waveform of battery pack 1C is not taken into consideration. A lower graph in FIG. 10 shows surge currents of battery packs 1A, 1B and 1C and the composite waveform of the surge current waveforms in the case of the affirmative judgment at step S713 in the flowchart of FIG. 9. The composite waveform of the surge current waveforms of battery packs 1A, 1B and 1C is contained or restricted at a level equal to or lower than the overcurrent allowable range as shown in this graph. Thus, the present invention is applicable to the power supply device 1 including three battery packs 1A, 1B and 1C, and the present invention is not limited in the number of battery packs.

The battery controllers 13A and 13B correspond to a sensing device or means according to the present invention; the power control apparatus 2 corresponds to a control device or means according to the present invention; and the memory 23 corresponds to a storage device or means according to the present invention.

The invention claimed is:

1. A power supply control apparatus for controlling a power supply including a parallel combination of series circuits each including a secondary battery and a relay connected in series with the secondary battery, to control ON/OFF state of each relay, the power supply control apparatus comprising:
    a control device configured to set a time difference among ON timings of the relays in an operation of switching from an OFF state in which all of the secondary batteries are disconnected from a load, to an ON state in which all of the secondary batteries are connected with the load; and
    a sensing device configured to sense degradation degrees of the secondary batteries,
    wherein the control device sets the time difference among the ON timings of the relays in accordance with the degradation degrees sensed by the sensing device.

2. The power supply control apparatus as claimed in claim 1, wherein the power supply control apparatus further comprises a storage device configured to store a control map representing a relationship between (1) a surge current waveform obtained when switching from the OFF state in which all of the secondary batteries are disconnected from the load, to the ON state in which all of the secondary batteries are connected with the load and (2) the time difference among the ON timings of the relays to make a current amplitude of the surge current waveform smaller than or equal to a predetermined value; and
    the control device is configured to calculate the surge current waveform obtained when switching from the OFF state in which all of the secondary batteries are disconnected from the load, to the ON state in which all of the secondary batteries are connected with the load, in accordance with the degradation degrees and to set the time difference among the ON timings of the relays by referring to the control map in accordance with the calculated surge current waveform.

3. The power supply control apparatus as claimed in claim 1, wherein the control device is configured to calculate, from the degradation degrees, a surge current waveform generated in each of the series circuits when the relay is turned on, to calculate a composite waveform obtained by overlapping the calculated surge current waveforms of the series circuits and to set the time difference among the ON timings of the relays to make a current amplitude of the composite waveform smaller than or equal to a predetermined current value, and wherein the sensing device is configured to sense internal resistances of the secondary batteries as the degradation degrees of the secondary batteries, and the control device is configured to calculate, as a surge current waveform, a current amplitude and a frequency of a surge current generated in each of the series circuits, from the internal resistances.

4. The power supply control apparatus as claimed in claim 1, wherein the control device is configured to calculate, from the degradation degrees, a surge current waveform generated in each of the series circuits when the relay is turned on, and to delay an ON timing of the relay of the series circuit in which a current value of the surge current waveform is smaller, with respect to the ON timing of the relay of the series circuit in which the current value of the surge current waveform is greater, and wherein the sensing device is configured to sense internal resistances of the secondary batteries as the degradation degrees of the secondary batteries, and the control device is configured to calculate, as a surge current waveform, a current amplitude and a frequency of a surge current generated in each of the series circuits, from the internal resistances.

5. The power supply control apparatus as claimed in claim 1, wherein the control device is further configured to set the time difference among ON timings of the relays in the operation of switching from the OFF state in which all of the secondary batteries are disconnected from the load, to the ON state in which all of the secondary batteries are connected with the load such that turning on the relays according to the time difference prevents overcurrent due to a combined surge current of the secondary batteries connected to the relays.

6. The power supply control apparatus as claimed in claim 1, wherein the control device is configured to calculate the time difference in accordance with the degradation degrees, and to turn on the relays with a delay time set equal to the time difference to delay a timing of a turn-on of one of the relays with respect to a timing of a turn-on of another of the relays.

7. The power supply control apparatus as claimed in claim 1, wherein the control device is configured to set the time difference to prevent overlap of a surge current caused by a turn-on of a first one of the relays and a surge current caused by a turn-on of a second one of the relays.

8. The power supply control apparatus as claimed in claim 1, wherein the control device is configured to turn on/off different relays at different times according to the time difference such that overcurrent due to a combined surge current of the secondary batteries connected to the relays is prevented.

9. A power supply control apparatus for controlling a power supply including a parallel combination of series circuits each including a secondary battery and a relay connected in series with the secondary battery, to control on/off state of each relay, the power supply control apparatus comprising:

a control device configured to set a time difference among OFF timings of the relays in an operation of switching from an ON state in which all of the secondary batteries are connected with a load, to an OFF state in which all of the secondary batteries are disconnected from the load; and a sensing device configured to sense degradation degrees of the secondary batteries, wherein the control device sets the time difference among the OFF timings of the relays in accordance with the degradation degrees sensed by the sensing device.

10. The power supply control apparatus as claimed in claim 9, wherein the control device is configured to calculate the time difference in accordance with the degradation degrees, and to turn off the relays with a delay time set equal to the time difference to delay a timing of a turn-off of one of the relays with respect to a timing of a turn-off of another of the relays.

\* \* \* \* \*